United States Patent
Cotanis et al.

(10) Patent No.: US 9,930,545 B2
(45) Date of Patent: Mar. 27, 2018

(54) REAL-TIME LOAD BALANCING FOR A NETWORK

(71) Applicant: Viavi Solutions Inc., Milpitas, CA (US)

(72) Inventors: Nicolae G. Cotanis, Warrenton, VA (US); Hyoung Suk Jeon, Fairfax, VA (US)

(73) Assignee: VIAVI Solutions Inc., San Jose, CA (US)

( * ) Notice: Subject to any disclaimer, the term of this patent is extended or adjusted under 35 U.S.C. 154(b) by 82 days.

(21) Appl. No.: 15/141,245

(22) Filed: Apr. 28, 2016

(65) Prior Publication Data

US 2017/0318479 A1    Nov. 2, 2017

(51) Int. Cl.

| G01R 31/08 | (2006.01) |
|---|---|
| H04W 24/02 | (2009.01) |
| H04L 12/26 | (2006.01) |
| H04W 16/24 | (2009.01) |
| H04W 24/08 | (2009.01) |
| H04W 36/22 | (2009.01) |

(52) U.S. Cl.
CPC ......... *H04W 24/02* (2013.01); *H04L 43/0882* (2013.01); *H04L 43/16* (2013.01); *H04W 16/24* (2013.01); *H04W 24/08* (2013.01); *H04W 36/22* (2013.01)

(58) Field of Classification Search
CPC ..... H04W 24/02; H04W 16/24; H04W 43/16; H04W 36/22; H04W 24/08; H04L 43/0882
See application file for complete search history.

(56) References Cited

U.S. PATENT DOCUMENTS

| 8,606,274 | B2 | 12/2013 | Borst et al. | |
|---|---|---|---|---|
| 2010/0075682 | A1* | 3/2010 | del Rio-Romero ... | H04W 28/08 455/439 |
| 2012/0120806 | A1* | 5/2012 | Jeon ...................... | H04W 28/08 370/235 |
| 2013/0095817 | A1* | 4/2013 | Karla .................... | H04W 24/02 455/422.1 |

(Continued)

FOREIGN PATENT DOCUMENTS

| CN | 104581829 | 4/2015 |
|---|---|---|
| CN | 102685806 | 7/2015 |

OTHER PUBLICATIONS

Nasri et al., "Handover Adaptation for Dynamic Load Balancing in 3GPP Long Term Evolution Systems," https://hal.inria.fr/hal-00918897/document, Dec. 16, 2013, 9 pages.

(Continued)

*Primary Examiner* — Robert Wilson
(74) *Attorney, Agent, or Firm* — Harrity & Harrity, LLP (57) ABSTRACT

A device may select a sector of a network on which to perform network traffic offloading based on a sector loading metric relating to an imbalance of loading of a set of cells of the sector. The device may identify a loaded cell of the sector based on one or more call admission metrics or one or more cell congestion metrics. The device may identify a less loaded neighbor (LLN) cell for the loaded cell. The device may cause one or more cell configuration alterations relating to causing network traffic to be offloaded from the loaded cell to the LLN cell.

20 Claims, 6 Drawing Sheets

(56) References Cited

U.S. PATENT DOCUMENTS

| | | | | |
|---|---|---|---|---|
| 2015/0031360 A1* | 1/2015 | Choi | ............... | H04W 36/22 |
| | | | | 455/436 |
| 2015/0055479 A1* | 2/2015 | Reider | ............ | H04W 36/22 |
| | | | | 370/236 |
| 2015/0087325 A1* | 3/2015 | Nuss | ............... | H04W 28/08 |
| | | | | 455/453 |
| 2016/0112902 A1* | 4/2016 | Huh | ............ | H04W 28/0289 |
| | | | | 370/235 |

OTHER PUBLICATIONS

Giovanidis et al., "A Distributed Interference-aware Load balancing Algorithm for LTE Multi-Cell Networks," http://ieeexplore.ieee.org/xpl/login.jsp?tp=&arnumber=6181222&url=http%3A%2F%Fieeexplore.ieee.org%2Fiel5%2F6176404%2F6181187%2F06181222.pdf%3Farnumber%3D6181222, Mar. 8, 2012, 8 pages.

Hahn et al., "Mobility Load Balancing—A Case Study: Simplified vs. Realistic Scenarios," http://www.fp7-semafour.eu/media/cms_page_media/9/SEMAFOUR_2014_COSTIC1004_TD(14)10030.pdf, May 28, 2014, 6 pages.

Siomina et al., "Load Balancing in Heterogeneous LTE: Range Optimization via Cell Offset and Load-Coupling Characterization," http://ieeexplore.ieee.org/xpl/login.jsp?tp=&arnumber=6364075&url=http%3A%2F%2Fieeexplore.ieee.org%2Fxpls%2Fabs_all.jsp%3Farnumber%3D6364075, Jun. 15, 2012, 5 pages.

* cited by examiner

REAL-TIME LOAD BALANCING FOR A NETWORK

BACKGROUND

A network may include a set of sectors representing geographic locations for which network services are provided. Each sector may include a group of cells, such as one or more cells associated with a particular radio access technology (RAT), one or more cells associated with a particular frequency for communications, or the like. One or more cells of the sector may have overlapping coverage areas. For example, a particular user device at a particular location in a sector may connect to a first cell, and may transfer from the first cell to a second cell. The network may be associated with network traffic that satisfies a threshold congestion condition. For example, a particular cell may be associated with a particular amount of allocatable bandwidth, and may experience poor performance after allocating a threshold percentage of the allocatable bandwidth. Moreover, after allocating available bandwidth of the particular cell, the particular cell may reject attempts by a user device to connect to the cell.

SUMMARY

According to some possible implementations, a device may include one or more processors. The one or more processors may select a sector of a network on which to perform network traffic offloading based on a sector loading metric relating to an imbalance of loading of a set of cells of the sector. The one or more processors may identify a loaded cell of the sector based on one or more call admission metrics or one or more cell congestion metrics. The one or more processors may identify a less loaded neighbor (LLN) cell for the loaded cell. The one or more processors may cause one or more cell configuration alterations relating to causing network traffic to be offloaded from the loaded cell to the LLN cell.

According to some possible implementations, a non-transitory computer-readable medium storing instructions may include one or more instructions that, when executed by one or more processors, may cause the one or more processors to select a first cell for which to perform load balancing based on a first plurality of metrics relating to call admission or a second plurality of metrics relating to cell congestion of the first cell. The one or more instructions, when executed by one or more processors, may cause the one or more processors to identify one or more neighbor cells for the first cell. The one or more instructions, when executed by one or more processors, may cause the one or more processors to select a second cell, of the one or more neighbor cells, based on a set of suitability criteria relating to a likelihood of network traffic transferring from the first cell to the second cell. The one or more instructions, when executed by one or more processors, may cause the one or more processors to determine, for a first time interval, a cell configuration alteration for a dynamic cell configuration. The one or more instructions, when executed by one or more processors, may cause the one or more processors to evaluate, for a second time interval, the cell configuration alteration relative to a static cell configuration. The second time interval may be greater than the first time interval. The one or more instructions, when executed by one or more processors, may cause the one or more processors to selectively implement the cell configuration alteration as the dynamic cell configuration or the static cell configuration.

According to some possible implementations, a method may include selecting, by a device, a particular sector of a network, of a group of sectors of the network, based on loading of a plurality of cells of the network. The method may include identifying, by the device, a loaded cell, of the plurality of cells, based on evaluating a bit mask relating to a first set of metrics of network traffic data. The method may include attempting to identify, by the device, a less loaded neighbor (LLN) cell, of the plurality of cells, based on identifying the loaded cell and based on a second set of metrics of the network traffic data. The method may include determining, by the device, an alteration to a configuration of a network device, of the network, to cause a reduction to a loading or a congestion of the loaded cell from a first value to a second value based on attempting to identify the LLN cell. The second value may be less than the first value. The method may include causing, by the device, the alteration to the configuration of the network device.

DETAILED DESCRIPTION

The following detailed description of example implementations refers to the accompanying drawings. The same reference numbers in different drawings may identify the same or similar elements.

A network management device may alter a set of network configuration parameters to perform load balancing for a network. For example, the network management device may cause communications associated with a first group of user devices to be prioritized over communications associated with a second group of devices to avoid degradation of network performance for the first group of user devices. The network management device may manage the set of network configuration parameters for multiple cells of a sector. A sector may refer to a group of locations for which network services (e.g., voice services or data services) are provided. For example, the sector may include a set of cells associated with one or more radio access technologies (RATs), one or more frequencies, or the like.

Network resources of a particular cell may include a particular network bandwidth, a particular amount of allocatable transmission power, a particular quantity of allocatable codes, or the like. A set of user devices may each be associated with different utilizations of network resources. For example, a first group of user devices utilizing a data service may utilize a greater amount of network resources than a second group of user devices utilizing a voice service. Although a quantity of user devices may be balanced for a first cell and a second cell of a sector (e.g., a first quantity associated with the first cell may be within a threshold amount of a second quantity associated with a second cell), network resource utilization for the first cell and the second cell may be imbalanced. For example, in a universal mobile telecommunications system (UMTS) system, the first cell may be associated with a first group of user devices utilizing less than a threshold quantity of downlink codes for voice service and the second cell may be associated with a second group of user devices utilizing greater than the threshold quantity of downlink codes.

A greater utilization of network resources by the second group of user devices connected to the second cell relative to the first group of user devices connected to the first cell of the particular sector may cause an imbalance in loading between the first cell and the second cell. Loading may refer to utilization of allocatable network resources. When a particular cell is experiencing a congestion condition (e.g., loading satisfying a threshold), user devices connected to the particular cell may experience degraded network performance. However, a network management device may fail to correct a loading imbalance between cells of a network as a result of identifying congestion conditions based on a quantity of user devices rather than a utilization of network resources.

Implementations, described herein, may identify loading of a group of cells and selectively alter a network configuration in real-time or near real-time to reduce a loading imbalance associated with the group of cells, thereby reducing a likelihood that a particular cell is associated with degraded network performance relating to a congestion condition relative to the network configuration remaining static. In this way, network performance is improved relative to a network with a loading imbalance among cells of the network. Moreover, based on identifying loading of a cell based on utilization of allocatable resources, a likelihood of causing a first cell to become overloaded (e.g., a threshold amount of resources to be utilized) when offloading network traffic relating to a second cell is reduced relative to selecting cells for offloading based on a quantity of connected user devices.

Figure 1A:
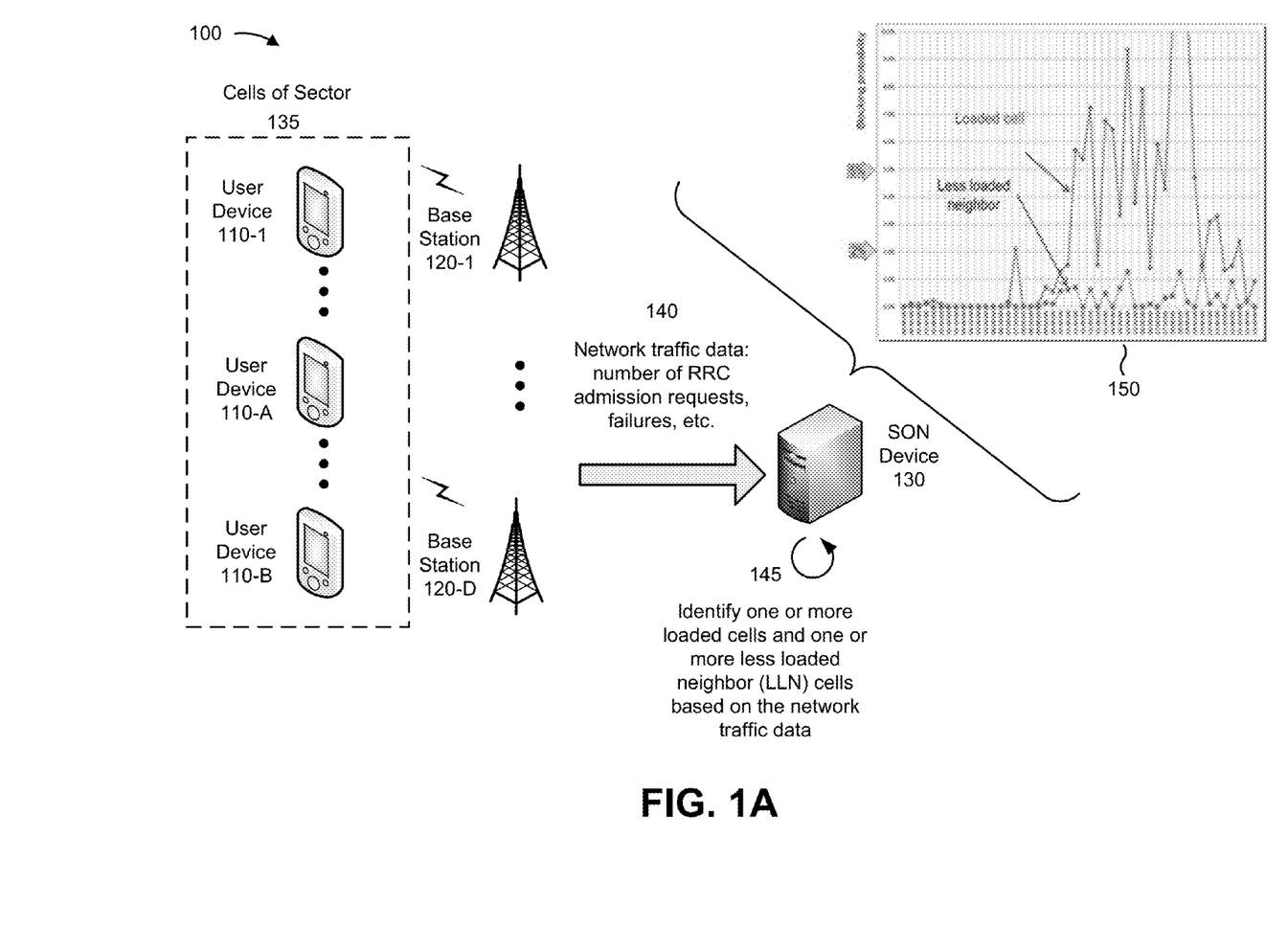
FIGS. 1A-1C are diagrams of an overview of an example implementation described herein.
Figure 1B:
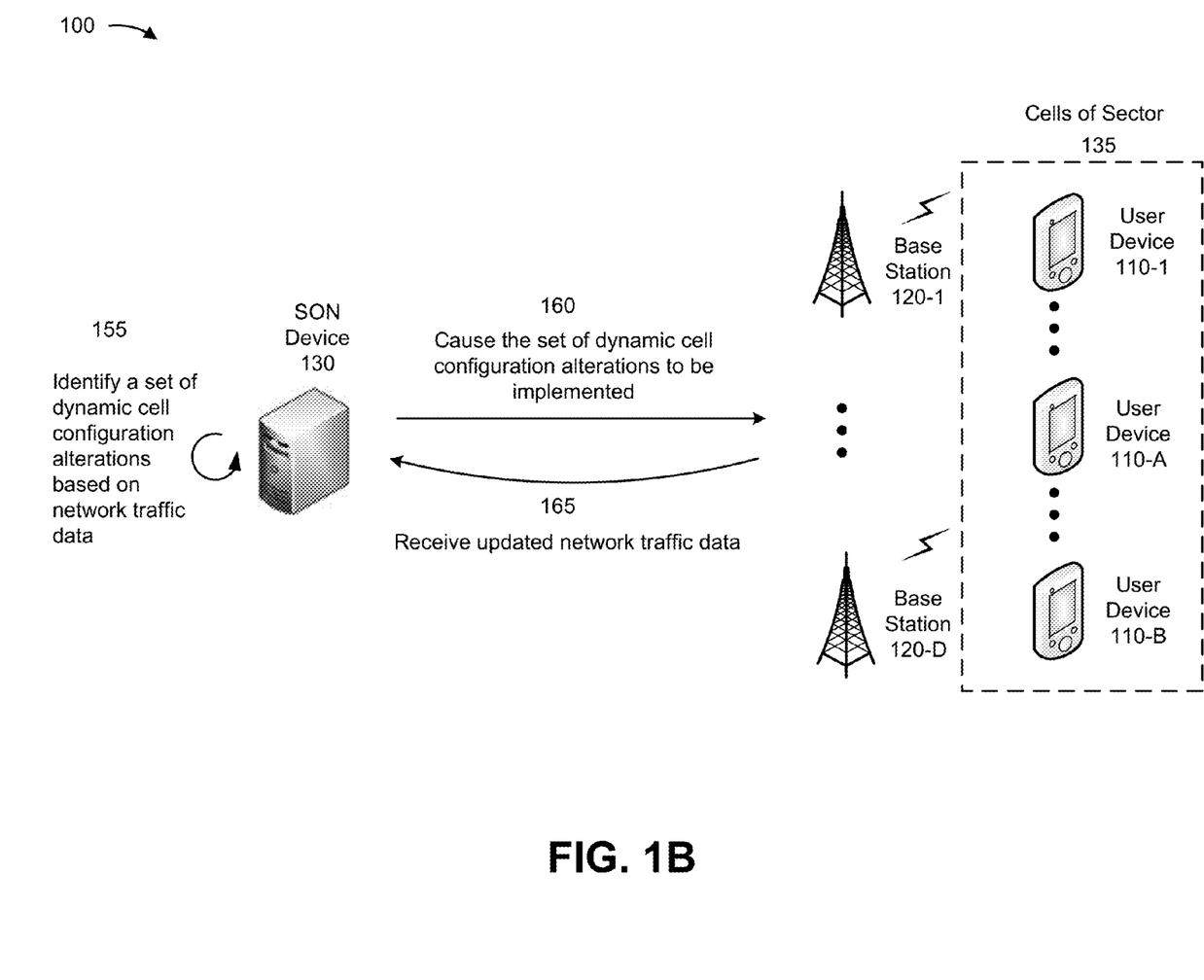
Figure 1C:
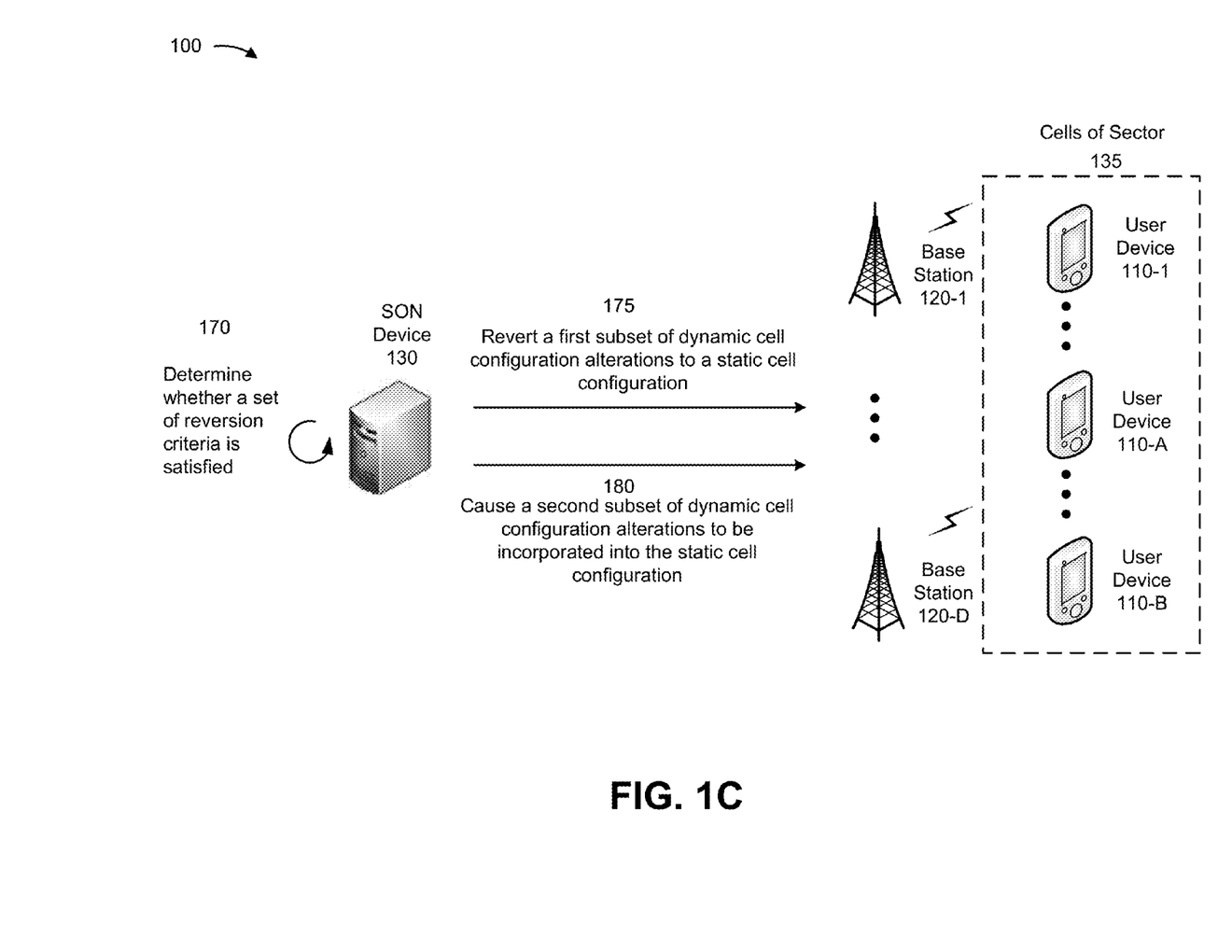

FIGS. 1A-1C are diagrams of an overview of an example implementation 100 described herein. As shown in FIG. 1A, example implementation 100 may include a set of user devices 110, a set of base stations 120, and a self-organizing network (SON) device 130 of a network.

As further shown in FIG. 1A, the set of user devices 110 may be located and operating in a set of cells of sector 135 (e.g., a set of cells associated with a particular geographic location). As shown by reference number 140, SON device 130 may obtain network traffic data regarding the set of user devices 110, the set of base stations 120, the set of cells of sector 135, or the like. For example, SON device 130 may obtain network traffic data identifying a quantity of radio resource control (RRC) admission requests, RRC admission request failures, or the like. In another example, SON device 130 may receive information identifying the network traffic data from a network device (not shown), such as an operations system support (OSS) device.

SON device 130 may select sector 135, from a group of sectors, for altering a network configuration to reduce loading. For example, SON device 130 may determine a sector loading metric associated with sector 135, an average sector load associated with sector 135, or the like for a group of sectors. The sector loading metric may be associated with an imbalance in cell load of cells of a particular sector (e.g., a ratio of load in a first cell of the sector to load in a second cell of the sector or a standard deviation of load in a set of cells). The average sector load may be associated with an average amount of load (e.g., network traffic, radio resources assigned, or codes allocated) associated with cells of a particular sector. In this case, SON device 130 may select sector 135 for altering the network configuration based on the sector loading metric and/or the average sector load satisfying a threshold. In another example, SON device 130 may rank multiple sectors based on sector loading metrics and/or average sector load, and may select sector 135 based on ranking the multiple sectors.

As further shown in FIG. 1A, and by reference number 145, based on selecting sector 135 for reducing loading, SON device 130 may identify one or more loaded cells of sector 135 and one or more less loaded neighbor (LLN) cells of sector 135. A loaded cell may refer to a cell that satisfies a set of threshold criteria related to call admission, cell congestion, or the like. For example, with regard to call admission, SON device 130 may determine that a particular cell is a loaded cell based on the particular cell satisfying a threshold relating to a quantity of rejections associated with downlink power for admission, a quantity of rejections associated with an insufficient quantity of downlink codes (e.g., relating to a threshold quantity of downlink codes available for allocation), a quantity of rejections associated with a radio network controller (RNC) congestion level, a quantity of rejections relating to insufficient uplink licenses or downlink licenses (e.g., relating to a threshold quantity of uplink licenses or downlink licenses available for allocation), or the like. Additionally, or alternatively, with regard to cell congestion, SON device 130 may determine that the particular cell is loaded based on the particular cell satisfying a threshold relating to a downlink dedicated channel (DCH) congestion time, a high speed shared channels congestion time, an Iub interface congestion time (a congestion time associated with an interface between the RNC and a node B base station 120 associated with the particular cell), a multimedia broadcast multicast (MBMS) congestion time, an Iub interface unavailability time, or the like.

In another example, SON device 130 may determine that the particular cell is a loaded cell based on a quantity of rejections relating to another resource utilization, such as a quantity of bearers (e.g., evolved-UMTS terrestrial radio access network (E-UTRAN) radio access bearers (E-RAB), a quantity of radio resource control (RRC) connected user equipments, a congestion level relating to a mobility management entity (MME), or the like. Similarly, SON device 130 may determine that the particular cell is a loaded cell based on an RRC connection intensity, an RRC procedure latency, a control channel element usage, a quantity of user equipment drops, or the like.

An LLN cell may refer to a cell that satisfies a set of threshold criteria relating to a cell blocking rate and is a neighbor cell for a loaded cell (e.g., an intra-frequency neighbor, an inter-frequency neighbor, or an inter-RAT neighbor). An LLN cell and a loaded cell may be associated with a common sector (e.g., sector 135) or may be associated with different sectors (e.g., the loaded cell may be located in sector 135 and a particular LLN cell for the loaded cell may be located in a different sector). For example, as shown by reference number 150, SON device 130 may determine that a loaded cell is associated with a first cell blocking rate and a second cell, neighboring the first cell, is associated with a second cell blocking rate. In this case, SON device 130 may determine that the second cell blocking rate is less than the first cell blocking rate by a threshold amount, and may classify the second cell as an LLN cell. SON device 130 may store information identifying a cell of sector 135 classified as a loaded cell and one or more cells of sector 135 classified as LLN cells for the loaded cell for utilization in determining a network configuration alteration associated with improving a loading imbalance associated with the loaded cell and the one or more LLN cells.

As shown in FIG. 1B, and by reference number 155, SON device 130 may identify one or more configuration alterations based on the network traffic data. For example, SON device 130 may determine a dynamic cell configuration alteration associated with altering a static cell configuration of the network. The static cell configuration may refer to a set of default values of a set of parameters associated with the network. The dynamic cell configuration may refer to a temporary alteration to one or more of the default values to alter operation of one or more cells of the network. For example, SON device 130 may alter a configuration of a particular base station 120, another network device of the network (e.g., an OSS device), or the like. In this case, when the time interval is satisfied and based on identifying one or more loaded cells of sector 135 and one or more LLN cells of sector 135, SON device 130 may alter a parameter of base station 120 to cause loading associated with a loaded cell of sector 135 to be offloaded to an LLN cell of sector 135 (or to an LLN cell of another sector). As shown by reference number 160, SON device 130 transmits information to cause the one or more dynamic cell configuration alterations to be implemented and, as shown by reference number 165, continues to receive network traffic data relating to sector 135.

As shown in FIG. 1C, and by reference number 170, SON device 130 determines whether a set of reversion criteria is satisfied for the network. A reversion criterion may relate to a condition for reverting a dynamic cell configuration alteration (e.g., for returning to one or more values associated with a static cell configuration) or causing the dynamic cell configuration alteration to be implanted as the static cell configuration (e.g., causing a value of the static cell configuration to match the dynamic cell configuration alteration). A particular reversion criterion may relate to a time threshold. For example, a dynamic cell configuration alteration may be reversed after a threshold period of time. In another example, the particular reversion criterion may relate to a congestion condition. For example, after congestion associated with a group of cells is balanced, SON device 130 may reverse the dynamic cell configuration alteration. In another example, SON device 130 may determine that the static cell configuration is associated with causing a loading imbalance (e.g., based on selecting a dynamic cell configuration associated with a common value for a threshold quantity of consecutive time intervals), and may cause the static cell configuration to be altered.

As further shown in FIG. 1C, and by reference numbers 175 and 180, SON device 130 may revert a first subset of the set of dynamic cell configuration alterations and may cause a second subset of the set of dynamic cell configuration alterations to be incorporated into the static cell configuration. For example, when a congestion condition associated with a cell is mitigated, SON device 130 may revert one or more dynamic cell configuration alterations associated with mitigating the congestion condition. In contrast, when a congestion condition associated with a cell continues for multiple time intervals associated with determining a dynamic cell configuration alteration, SON device 130 may cause the static cell configuration to match the dynamic cell configuration alteration, thereby reducing a likelihood that SON device 130 is caused to repeatedly alter the static cell configuration by implementing multiple dynamic cell configuration alterations.

In this way, SON device 130 reduces a congestion imbalance in real-time or near real-time (e.g., rather than requiring days or weeks of data and data analysis to reduce the congestion imbalance) associated with multiple cells of a sector, thereby improving network performance for the sector relative to a static configuration. Moreover, based on utilizing criteria relating to cell congestion and admission in selecting loaded cells and LLN cells, SON device 130 increases a likelihood that cells selected for altering a configuration are suitable for offloading network traffic and/or receiving network traffic relative to utilizing a metric relating to a quantity of user devices 110 connected to the network.

As indicated above, FIGS. 1A-1C are provided merely as an example. Other examples are possible and may differ from what was described with regard to FIGS. 1A-1C.

Figure 2:
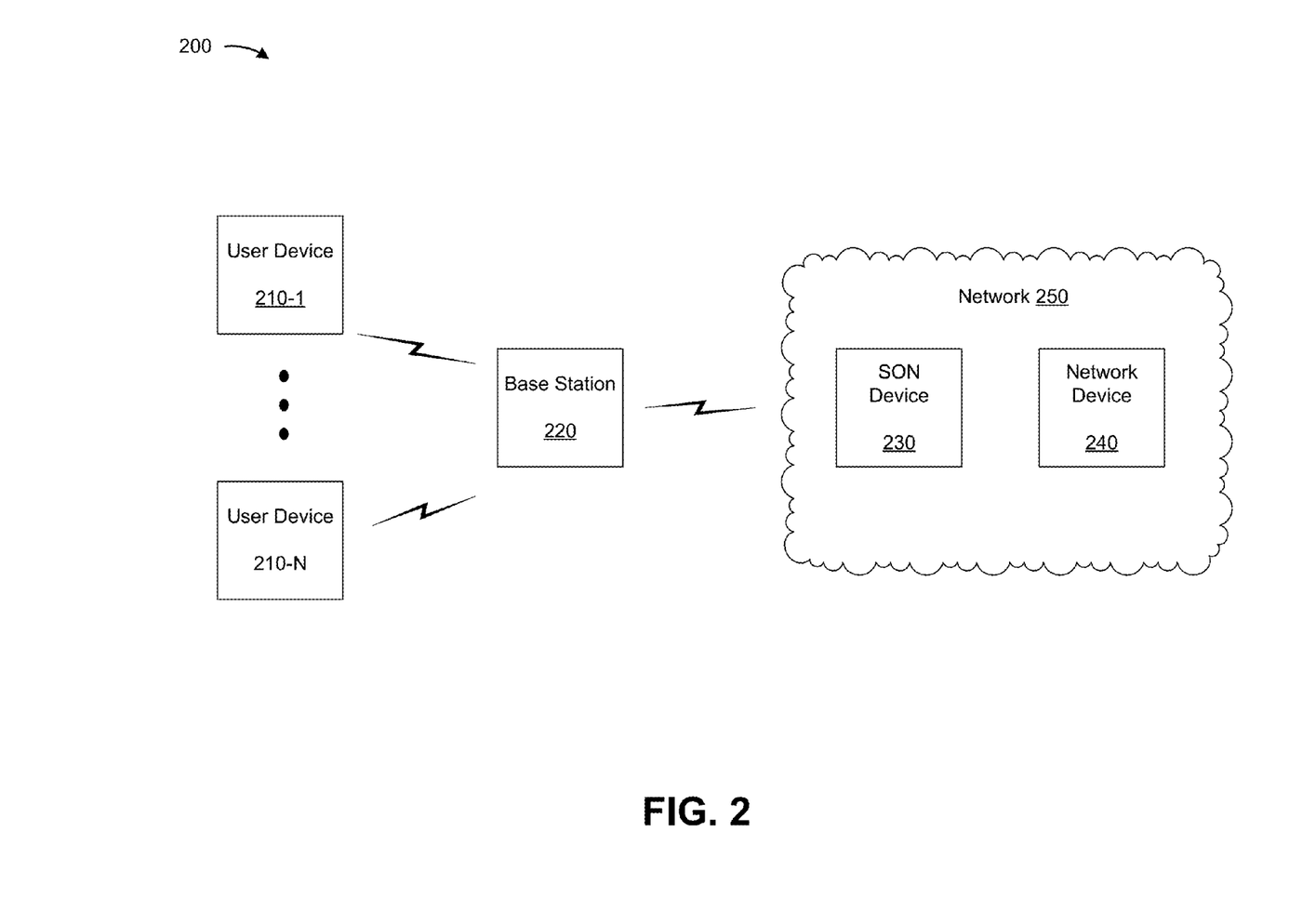
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N (N≥1) (herein referred to collectively as "user devices 210," and individually as "user device 210"), a base station 220, a SON device 230, a network device 240, and a network 250. Devices of environment 200 may interconnect via wired connections, wireless connections, or a combination of wired and wireless connections.

User device 210 includes one or more devices capable of receiving, generating, storing, processing, and/or providing information associated with communications via network 250. For example, user device 210 may include a communication and computing device, such as a mobile phone (e.g., a smart phone or a radiotelephone), a computer (e.g., a laptop computer, a tablet computer, a handheld computer, or a desktop computer), a gaming device, a wearable communication device (e.g., a smart wristwatch or a pair of smart eyeglasses), or a similar type of device. In some implementations, user device 210 corresponds to user devices 110 shown in FIGS. 1A-1C. In some implementations, user device 210 may receive information from and/or transmit information to another device in environment 200.

Base station 220 includes one or more devices capable of communicating with user device 210 using a cellular radio access technology. For example, base station 220 may include a base transceiver station, a radio base station, a node B, an evolved node B (eNB), a base station subsystem, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between user device 210 and network 250. In some implementations, base station 220 corresponds to base stations 120 shown in FIGS. 1A-1C. In some implementations, base station 220 may communicate with user device 210 (and/or one or more other devices) using radio waves.

SON device 230 includes one or more devices capable of receiving, generating, storing, processing, and/or providing information associated with communications via network 250. For example SON device 130 may include a network management device that receives network traffic data and causes an alteration to a configuration of another device of environment 200 based on the network traffic data. In some implementations, SON device 230 may be implemented in a single centralized SON device. In some implementations, SON device 230 may be implemented in a set of multiple distributed SON devices, such as a set of SON devices associated with a set of base stations 220. In some implementations, SON device 230 corresponds to SON device 130 shown in FIGS. 1A-1C. In some implementations, SON device 230 may receive information from and/or transmit information to another device in environment 200.

Network device 240 includes one or more devices capable of receiving, generating, storing, processing, and/or providing information associated with communications via network 250. For example, network device 240 may include a firewall, a router, a gateway, a switch, a hub, a bridge, a reverse proxy, a server (e.g., a proxy server), a mobility management entity (MME), a serving gateway (SGW), a packet data network gateway (PGW), a home subscriber server (HSS), an access network discovery and selection function (ANDSF) device, an evolved packet data gateway (ePDG), an evolved packet system mobility management (EMM) device, a load balancer, an OSS, or a similar device. In some implementations, network device 240 may receive information from and/or transmit information to another device in environment 200.

Network 250 may include one or more wired and/or wireless networks. For example, network 250 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although SON device 230 and base station 220 are described as separate devices, SON device 230 and base station 220 may be implemented in a single device. Additionally, or alternatively, a set of devices (e.g., one or more devices) of environment 200 may perform one or more functions described as being performed by another set of devices of environment 200.

Figure 3:
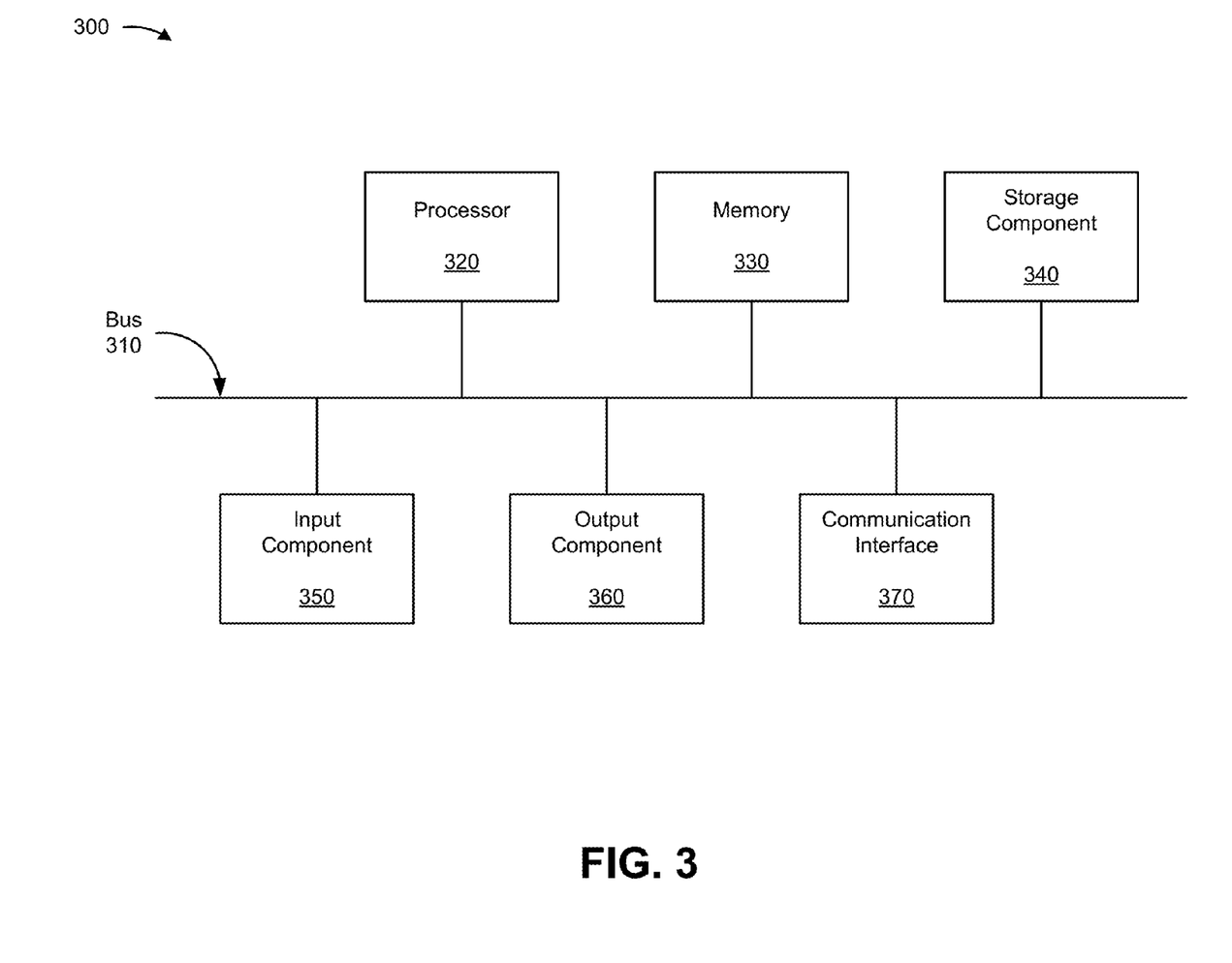
FIG. 3 is a diagram of example components of one or more devices of FIG. 2.

FIG. 3 is a diagram of example components of a device 300. Device 300 may correspond to user device 210, base station 220, SON device 230, and/or network device 240. In some implementations, user device 210, base station 220, SON device 230, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
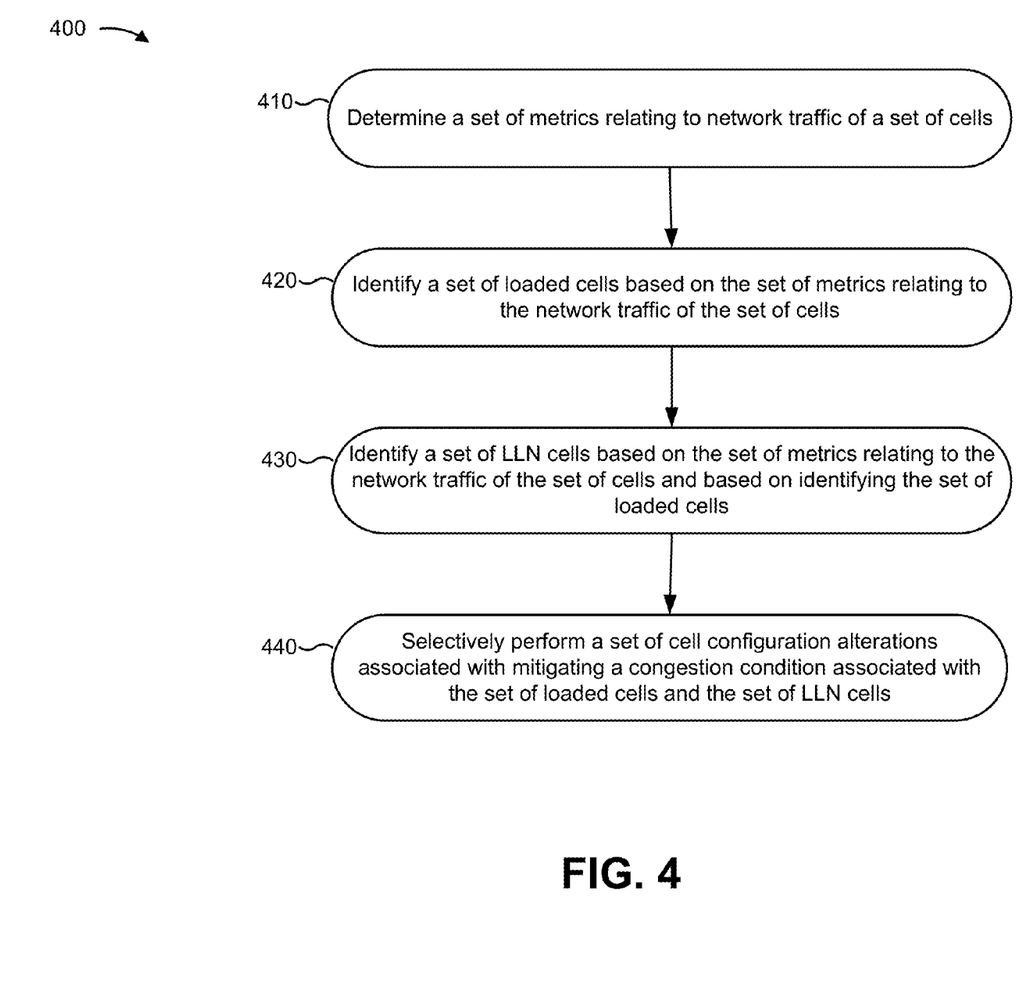
FIG. 4 is a flow chart of an example process for altering a configuration of a network based on a network loading condition.

FIG. 4 is a flow chart of an example process 400 for altering a configuration of a network based on a network loading condition. In some implementations, one or more process blocks of FIG. 4 may be performed by SON device

230. In some implementations, one or more process blocks of FIG. 4 may be performed by another device or a group of devices separate from or including SON device 230, such as user device 210, base station 220, and/or network device 240.

As shown in FIG. 4, process 400 may include determining a set of metrics relating to network traffic of a set of cells (block 410). For example, SON device 230 may determine a set of metrics relating to network traffic of a set of cells. In some implementations, SON device 230 may determine the set of metrics relating to network traffic of the set of cells based on receiving network traffic data. For example, SON device 230 may receive network traffic data from a data source, such as one or more user devices 210, one or more base stations 220, one or more network devices 240, or the like. In some implementations, SON device 230 may monitor the data source to obtain the network traffic data. For example, SON device 230 may communicate with a particular network device 240 (e.g., an OSS device or an MME device) to obtain data relating to mobility of one or more user devices 210, such as data relating to a load of network 250, a predicted load of network 250, a sector inter-layer balance (e.g., a load balance) for sectors of network 250, a sector intra-layer balance for sectors of network 250, a cell outage status of cells of network 250, a handover metric, a radio link control set-up metric, a call admission metric, a cell congestion metric, or the like. Additionally, or alternatively, SON device 230 may communicate with one or more user devices 210 to obtain network traffic data regarding admission to a particular cell of network 250.

In some implementations, SON device 230 may determine a particular metric of the set of metrics based on values of a group of other metrics of the set of metrics. For example, based on a particular group of metrics identifying loading for a group of cells, SON device 230 may determine a sector loading metric relating to a standard deviation of the loading for the group of cells. Additionally, or alternatively, SON device 230 may store network traffic data to determine a particular metric of the set of metrics. For example, SON device 230 may receive, in real-time or near real-time relating to a particular time interval, network traffic data and may store the network traffic data with network traffic data relating to one or more other time intervals, and may determine a particular metric, such as a quantity of rejections associated with the cell based on the network traffic data relating to the particular time interval and the one or more other time intervals.

As further shown in FIG. 4, process 400 may include identifying a set of loaded cells based on the set of metrics relating to network traffic of the set of cells (block 420). For example, SON device 230 may identify a set of loaded cells based on the set of metrics relating to network traffic of the set of cells. In some implementations, based on the set of metrics, SON device 230 may select a particular sector from which to identify the set of loaded cells. For example, SON device 230 may identify a group of sectors, of network 250, associated with an RRC request failure rate satisfying a threshold, a congestion time satisfying a threshold, or the like. In some implementations, SON device 230 may filter the group of sectors based on a sector loading metric. The sector loading metric, for a particular sector, may be based on an average normalized blocking rate for cells in the particular sector (e.g., an average of a normalized blocking rate for each cell of the particular sector) and/or a standard deviation of the normalized blocking rate for cells in the sector. For example, SON device 230 may determine a subgroup of sectors, of the group of sectors, for which the sector loading metric satisfies a threshold indicating that one or more sectors, of the subgroup of sectors, are associated with a loading imbalance for which to perform a cell configuration alteration. In this case, SON device 230 may rank the one or more sectors of the subgroup of sectors based on the sector loading metric, and may select a particular sector from which to identify the set of loaded cells based on ranking the one or more sectors. Additionally, or alternatively, SON device 230 may determine the set of loaded cells for each sector of the subgroup of sectors.

In some implementations, SON device 230 may identify the set of loaded cells for a particular sector (e.g., a subset of cells, of the set of cells and of the particular sector, that are associated with a congestion condition). For example, SON device 230 may identify a particular loaded cell based on one or more call admission metrics of the set of metrics. In some implementations, SON device 230 may generate a mask (e.g., a bit mask) to evaluate one or more cells of the particular sector based on the one or more call admission metrics. For example, with regard to a UMTS system, SON device 230 may establish a mask associated with selecting a cell as a loaded cell based on the cell satisfying an RNC congestion threshold (e.g., a threshold quantity of rejections resulting from RNC congestion) and an uplink licenses threshold (e.g., a threshold quantity of rejections resulting from a lack of uplink licenses for allocation) and a downlink licenses threshold (e.g., a threshold quantity of rejections resulting from a lack of downlink licenses for allocation) and at least one of a downlink power threshold (e.g., a threshold quantity of rejections when exceeding an assigned downlink power for admission) or a downlink codes threshold (e.g., a threshold quantity of rejections resulting from a lack of downlink codes for allocation).

Additionally, or alternatively, SON device 230 may identify a particular loaded cell based on one or more cell congestion metrics. In some implementations, SON device 230 may generate a mask to evaluate one or more cells of the particular sector based on the one or more cell congestion metrics. For example, with regard to a UMTS system, SON device 230 may establish a mask associated with selecting a cell as a loaded cell based on the cell satisfying an Iub interface congestion time threshold and an MBMS congestion time threshold and an Iub interface unavailability time threshold and at least one of a downlink DCH congestion time threshold or a high speed shared channels congestion time threshold.

Additionally, or alternatively, SON device 230 may utilize one or more different metrics, one or more additional metrics, one or more fewer metrics, or another combination of metrics and/or logic to select a cell as a loaded cell based on the one or more call admission metrics.

In some implementations, SON device 230 may select a particular loaded cell for which to identify a set of LLN cells. For example, SON device 230 may rank a set of loaded cells based on a criticality metric relating to a level of congestion for the set of loaded cells. In this case, SON device 230 may select a particular loaded cell for which to identify the set of LLN cells and alter a cell configuration based on the criticality metric. Additionally, or alternatively, based on the criticality metric, SON device 230 may select an order for which to evaluate multiple loaded cells to identify a set of LLN cells and alter a cell configuration.

As further shown in FIG. 4, process 400 may include identifying a set of LLN cells based on the set of metrics relating to network traffic of the set of cells and based on identifying the set of loaded cells (block 430). For example, SON device 230 may identify a set of LLN cells based on the set of metrics relating to network traffic of the set of cells and based on identifying the set of loaded cells. In some implementations, SON device 230 may identify a blocking rate associated with a particular cell of a particular sector to determine that the particular cell is an LLN cell associated with a particular loaded cell of the set of loaded cells. For example, SON device 230 may identify one or more neighbor cells for the particular loaded cell, and may select a particular neighbor cell, of the one or more neighbor cells, associated with a blocking rate that satisfies a threshold.

In some implementations, SON device 230 may select the threshold for the blocking rate based on a blocking rate of the particular loaded cell. For example, SON device 230 may determine that the particular loaded cell is associated with a particular blocking rate, and may select a threshold blocking rate that is less than the particular blocking rate by a threshold quantity. In this case, SON device 230 may identify one or more neighbor cells of the particular loaded cell associated with corresponding cell blocking rates that satisfy the threshold blocking rate as the set of LLN cells. In this way, SON device 230 ensures that a first blocking rate of a loaded cell and a second blocking rate of an LLN cell are associated with a threshold difference associated with permitting offloading of network traffic from the loaded cell to the LLN cell without the LLN cell becoming loaded. In some implementations, SON device 230 may select a least loaded cell of a sector as an LLN cell for a particular loaded cell.

In some implementations, SON device 230 may utilize a hypothesis testing procedure to determine the set of LLN cells. For example, SON device 230 may perform a simulation of a particular cell being selected as an LLN cell and a configuration change being performed for the particular cell, and may determine a probability of the particular cell being overloaded based on offloading of a loaded cell to the particular cell. In this case, SON device 230 may determine that the probability of the particular cell being overloaded satisfies a threshold (e.g., 0.1%, 1% or 5%), and may select the particular cell as an LLN cell for the loaded cell. In this way, SON device 230 ensures that a particular cell selected as an LLN cell does not have greater than a threshold risk of becoming loaded after a cell configuration alteration, thereby reducing a likelihood of cell congestion relative to a network management device that selects cells at a high risk of becoming loaded to receive traffic from a loaded cell.

In some implementations, SON device 230 may rank the set of LLN cells based on a set of suitability criteria. The set of suitability criteria may refer to one or more criteria relating to a probability of a particular LLN cell acquiring one or more user devices 210 from a particular loaded cell (e.g., the one or more user devices 210 transferring from the particular loaded cell to the particular LLN cell) when the one or more user devices 210 are in a connected mode, an idle mode, or the like. In this way, SON device 230 may reduce a likelihood that a cell configuration alteration does not reduce a congestion condition as a result of user devices 210 remaining connected to a loaded cell relative to another technique to determine a cell configuration alteration.

Additionally, or alternatively, SON device 230 may rank the set of LLN cells based on one or more suitability criteria relating to a user device mobility, such as a soft handover or hard handover counter (e.g., a quantity of outbound or inbound soft handover or hard handover attempts, successes, or the like for a particular LLN cell and the particular loaded cell). Additionally, or alternatively, SON device 230 may rank the set of LLN cells based on the hypothesis testing. For example, SON device 230 may rank the set of LLN cells based on the probability of each of the set of LLN cells being overloaded, and may select a cell configuration alteration to cause network traffic to be offloaded from a particular loaded cell to a particular LLN cell based on ranking the set of LLN cells.

In some implementations, SON device 230 may select multiple cells as LLN cells to receive network traffic offloaded from a particular loaded cell. For example, SON device 230 may select to utilize multiple LLN cells to offload network traffic from a particular loaded cell based on multiple LLN cells satisfying a threshold level of suitability (e.g., satisfying a threshold level for a particular metric relating to the set of suitability criteria). In this case, SON device 230 may select a cell configuration alteration associated with causing network traffic to be offloaded to the multiple cells (e.g., equal amounts of network traffic to be offloaded to each of the multiple cells or different amounts of network traffic to be offloaded to each of the multiple cells, such as based on a congestion level of each of the multiple cells or the like). Additionally, or alternatively, SON device 230 may select a first LLN cell, of the set of LLN cells, based on ranking the set of LLN cells for offloading network traffic from a first loaded cell, and may select a second LLN cell, of the set of LLN cells, for offloading network traffic from a second loaded cell.

In some implementations, SON device 230 may fail to identify an LLN cell. For example, SON device 230 may determine that a particular loaded cell is not associated with an LLN cell. In this case, based on unsuccessfully attempting to identify the LLN cell, SON device 230 may determine that the particular loaded cell is congested (e.g., based on one or more metrics relating to congestion), and may determine an alteration to a cell configuration to reduce congestion of the particular loaded cell (e.g., without causing offloading).

As further shown in FIG. 4, process 400 may include selectively performing a set of cell configuration alterations associated with mitigating a congestion condition associated with the set of loaded cells based on identifying the set of loaded cells and the set of LLN cells (block 440). For example, SON device 230 may selectively perform a set of cell configuration alterations associated with mitigating a congestion condition associated with the set of loaded cells based on identifying the set of loaded cells and the set of LLN cells. In some implementations, SON device 230 may determine a cell configuration alteration. For example, SON device 230 may identify an alteration to a parameter value associated with mobility of one or more user devices 210 (e.g., inter-cell mobility) to cause mobility load balancing to occur (e.g., one or more user devices 210 to transfer from a particular loaded cell to a particular LLN cell).

In some implementations, SON device 230 may perform a dynamic cell configuration alteration associated with altering a value of a parameter relating to a static cell configuration based on identifying the set of loaded cells and the set of LLN cells. For example, based on a threshold period of time elapsing, SON device 230 may evaluate one or more parameters associated with a cell configuration for a particular loaded cell and a particular LLN cell, and may identify an alteration to a parameter to cause offloading from the loaded cell to the particular LLN cell. In this case, SON device 230 may transmit information to network device 240 (e.g., an OSS device) to cause the parameter to be altered.

In some implementations, SON device 230 may perform a dynamic cell configuration alteration that alters a value of a parameter relating to a static cell configuration by a quantized amount. For example, for a parameter with a particular value relating to the static cell configuration, SON device 230 may select a particular dynamic cell configuration alteration to the particular value of a particular amount. In this case, SON device 230 may increase the alteration to the particular amount by causing the static cell configuration to be altered to an increased value. In other words, for a parameter of a default value of 5, SON device 230 may cause a dynamic alteration to a value of 6 (an increase of +1 from the default value). In this case, when SON device 230 determines that the value of 6 has been selected for a threshold quantity of consecutive time intervals, SON device 230 may alter the default value to a new default value of 6. Further to the example, SON device 230 may subsequently determine that the value should be further altered to a value of 7 (an increase of +1 from the new default value), SON device 230 may cause dynamic alteration to the new default value of 6 to cause the value to be 7. In this way, SON device 230 performs a stepwise alteration to a value of a parameter.

In some implementations, SON device 230 may alter the default value (e.g., the static cell configuration) based on an average value of the default value of a particular period of time being different from the default value by a threshold quantity. For example, SON device 230 may determine that, for a time period, the average value of a parameter was 6.8 relative to a default value of 6. In this case, if the threshold quantity is 0.5, SON device 230 may alter the default value from 6 to 7, thereby reducing a percentage of time intervals for which the static cell configuration is altered relative to utilizing a default value of 6.

In some implementations, SON device 230 may selectively transmit information to network device 240 to cause the parameter to be altered. For example, SON device 230 may determine, for a first time interval, a first dynamic cell configuration alteration to a value of a parameter and may transmit information to cause the first dynamic cell configuration alteration to the value of the parameter, and may determine, for a second subsequent time interval, a second dynamic cell configuration alteration to the value of the parameter. In this case, if the second dynamic cell configuration alteration and the first dynamic cell configuration alteration are associated with a common parameter value (e.g., a common value for a particular parameter), SON device 230 may refrain from transmitting information to network device 240, thereby causing the first dynamic cell configuration alteration to be implemented for the second time interval with reduced network traffic relative to transmitting information to cause the same cell configuration alteration to be performed. In contrast, if the second dynamic cell configuration alteration is a different value than the first dynamic cell configuration alteration, SON device 230 may transmit information to cause the second dynamic cell configuration alteration to be implemented and the first dynamic cell configuration alteration to be reverted.

In some implementations, SON device 230 may revert a dynamic alteration to a cell configuration. For example, after expiration of a threshold period of time and/or a congestion condition associated with the loaded cell, SON device 230 may transmit information identifying a value of the parameter for the static cell configuration to cause the parameter to be reverted to the value associated with the static cell configuration. In some implementations, SON device 230 may alter the static cell configuration based on a dynamic cell configuration alteration. For example, when a dynamic cell configuration alteration is caused to be implemented, SON device 230 may evaluate a timer associated with the parameter, and may determine that the timer has exceeded a threshold associated with implementing one or more dynamic configuration alterations. In this case, SON device 230 may cause the static configuration to be altered to match the dynamic configuration alteration (e.g., to alter a default value of a parameter and permit a subsequent dynamic configuration alteration to be performed).

In some implementations, SON device 230 may alter a cell configuration without successfully identifying an LLN cell for a loaded cell (e.g., based on SON device 230 failing to identify the LLN cell when attempting to identify the LLN cell). For example, SON device 230 may determine a cell configuration that is to reduce congestion of a loaded cell (e.g., based on determining that the loaded cell is congested based on one or more metrics relating to congestion) without determining the LLN cell (e.g., based on identifying a loaded cell), and may cause the cell configuration to be implemented for one or more cells. In this case, SON device 230 may cause an adjustment to an admission threshold, such as a parameter associated with identifying a percentage of an absolute admission limit for downlink code usage, a parameter associated with identifying a percentage of an absolute admission limit for downlink power utilization, or the like. Similarly, SON device 230 may cause an adjustment to a control parameter, such as a parameter relating to a hysteresis time, a parameter relating to downlink transmission carrier power overload, a parameter relating to an amount of an access selection enabler (ASE) to be released in downlink for guaranteed traffic, a parameter relating to an amount of an ASE to be released in downlink for non-guaranteed traffic, or the like.

In some implementations, SON device 230 may determine that a particular loaded cell is congested, and may alter a cell configuration based on determining that the particular loaded cell is congested. For example, when successfully identifying an LLN cell for the particular loaded cell and causing a first alteration to a cell configuration to cause offloading of network traffic from the particular loaded cell to the LLN cell, SON device 230 may determine that the particular loaded cell is congested, and may cause a second alteration to a cell configuration to cause a reduction in congestion. Additionally, or alternatively, when SON device 230 is unsuccessful in identifying the LLN cell, SON device 230 may determine that the particular loaded cell is congested, and may cause an alteration to a cell configuration to cause a reduction in congestion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, SON device 230 identifies a loaded cell and an LLN cell and causes a cell configuration alteration to offload network traffic from the loaded cell to the LLN cell. Moreover, SON device 230 utilizes a mask relating to a group of call admission metrics and a group of cell congestion metrics and/or hypothesis testing to ensure that there is an increased likelihood of causing the network traffic to be offloaded from the loaded cell to the LLN cell without overloading the LLN cell relative to a load balancing procedure associated with a quantity of user devices 210 connected to a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory storing instructions; and
one or more processors, configured to execute the instructions, to:
select a sector of a network on which to perform network traffic offloading based on a sector loading metric relating to an imbalance of loading of a set of cells of the sector;
identify a loaded cell of the sector based on one or more call admission metrics or one or more cell congestion metrics;
identify a less loaded neighbor (LLN) cell for the loaded cell; and
cause one or more cell configuration alterations relating to causing network traffic to be offloaded from the loaded cell to the LLN cell.

2. The device of claim 1, where the one or more processors are further configured to execute the instructions to: determine a particular cell configuration alteration, of the one or more cell configuration alterations, based on network traffic data relating to a first time interval; and
where the one or more processors, when causing the one or more cell configuration alterations, are configured to:
cause the particular cell configuration alteration to be implemented as a dynamic configuration alteration;
evaluate the particular cell configuration alteration based on a second time interval,
the second time interval being greater than the first time interval; and
cause the particular cell configuration alteration to be implemented as a static cell configuration alteration based on evaluating the particular cell configuration alteration based on the second time interval.

3. The device of claim 1, where the one or more processors are further configured to execute the instructions to:
determine that a reversion criterion is satisfied,
the reversion criterion relating to a time interval associated with implementing the one or more cell configuration alterations; and
revert the one or more cell configuration alterations based on determining that the reversion criterion is satisfied.

4. The device of claim 1, where the one or more processors are further configured to execute the instructions to:
receive network traffic data relating to the loaded cell;
determine that a congestion condition associated with the loaded cell is mitigated; and
revert the one or more cell configuration alterations based on determining that the congestion condition associated with the loaded cell is mitigated.

5. The device of claim 1, where the one or more processors, when executing the instructions to identify the loaded cell of the sector, are to:
generate a mask relating to the one or more call admission metrics or the one or more cell congestion metrics associated with a particular cell of the set of cells;
evaluate a logic of the mask to determine that the particular cell is congested; and
classify the particular cell as the loaded cell based on evaluating the logic of the mask.

6. The device of claim 1, where the one or more call admission metrics include at least one of:
a first quantity of rejections occurring when a downlink power for admission satisfies a first threshold assigned downlink power for admission,
a second quantity of rejections relating to a quantity of downlink codes satisfying a second threshold,
a third quantity of rejections relating to radio network controller congestion satisfying a third threshold,
a fourth quantity of rejections relating to a quantity of uplink licenses satisfying a fourth threshold,
a fifth quantity of rejections relating to a quantity of downlink licenses satisfying a fifth threshold,
a sixth quantity of rejections associated with downlink power for admission satisfying a sixth threshold,
a seventh quantity of user equipments satisfying a seventh threshold,
an eighth quantity of radio access bearers satisfying an eighth threshold, or
a ninth quantity of rejections relating to mobility management entity congestion satisfying a ninth threshold.

7. The device of claim 1, where the one or more cell congestion metrics include at least one of:
a downlink dedicated channel congestion time satisfying a first threshold, a high speed shared channels congestion time satisfying a second threshold,
an Iub interface congestion time satisfying a third threshold,
a multimedia broadcast multicast congestion time satisfying a fourth threshold,
an Iub interface unavailability time satisfying a fifth threshold,
a radio resource control (RRC) connection intensity satisfying a sixth threshold,
an RRC procedure latency satisfying a seventh threshold,
a control channel element utilization satisfying an eighth threshold, or
a quantity of user equipment drops satisfying a ninth threshold.

8. The device of claim 1, where the one or more processors are further configured to execute the instructions to:
determine a first blocking rate associated with the loaded cell;
determine one or more second blocking rates associated with one or more other cells of the sector,
the one or more other cells of the sector including the LLN cell;
determine that the LLN cell is associated with a particular second blocking rate, of the one or more second blocking rates, that satisfies a threshold,
the threshold relating to the first blocking rate,
the particular second blocking rate being less than the first blocking rate; and
where the one or more processors, when identifying the LLN cell, are configured to:
identify the LLN cell based on determining that the LLN cell is associated with the particular second blocking rate that satisfies the threshold.

9. The device of claim 8, where the one or more processors are further configured to execute the instructions to:
determine that a particular set of cells, of the one or more other cells, are associated with a particular set of second blocking rates, of the one or more second blocking rates, that each satisfy the threshold,
the particular set of cells including the LLN cell;
rank the particular set of cells based on a set of suitability criteria; and
where the one or more processors, when identifying the LLN cell, are configured to:
identify the LLN cell based on ranking the particular set of cells.

10. The device of claim 9, where the set of suitability criteria includes at least one of:
a quantity of outbound handover attempts from the loaded cell,
a quantity of inbound handover attempts to the loaded cell, or
a value of a blocking rate relative to the first blocking rate.

11. A non-transitory computer-readable medium storing instructions, the instructions comprising:
one or more instructions that, when executed by one or more processors, cause the one or more processors to:
select a first cell for which to perform load balancing based on a first plurality of metrics relating to call admission or a second plurality of metrics relating to cell congestion of the first cell;
identify one or more neighbor cells for the first cell;
select a second cell, of the one or more neighbor cells, based on a set of suitability criteria relating to a likelihood of network traffic transferring from the first cell to the second cell;
determine, for a first time interval, a cell configuration alteration for a dynamic cell configuration;
evaluate, for a second time interval, the cell configuration alteration relative to a static cell configuration, the second time interval being greater than the first time interval; and
selectively implement the cell configuration alteration as the dynamic cell configuration or the static cell configuration.

12. The non-transitory computer-readable medium of claim 11, where the one or more instructions, that cause the one or more processors to selectively implement the cell configuration alteration, cause the one or more processors to:
alter the static cell configuration based on the cell configuration alteration.

13. The non-transitory computer-readable medium of claim 11, where the one or more instructions, that cause the one or more processors to selectively implement the cell configuration alteration, further cause the one or more processors to:
implement the cell configuration alteration as the dynamic cell configuration;
determine that a third time interval is expired,
the third time interval corresponding to another cell configuration alteration for the dynamic cell configuration; and
transmit information identifying the other cell configuration to revert the cell configuration and implement the other cell configuration alteration for the dynamic cell configuration.

14. The non-transitory computer-readable medium of claim 11, where the one or more instructions, that cause the one or more processors to selectively implement the cell configuration alteration, further cause the one or more processors to:
implement the cell configuration alteration as the dynamic cell configuration;
determine that a third time interval is expired,
the third time interval corresponding to another cell configuration alteration for the dynamic cell configuration;
determine that the other cell configuration and the cell configuration are associated with a common parameter value for the dynamic cell configuration; and
determine to refrain from transmitting information identifying the other cell configuration to cause the common parameter value for the dynamic cell configuration to remain implemented.

15. The non-transitory computer-readable medium of claim 11, where the one or more instructions, that cause the one or more processors to select the second cell, cause the one or more processors to:
perform a hypothesis testing procedure to select the second cell,
a result of the hypothesis testing procedure indicating that the second cell is associated with a likelihood of being overloaded, when offloading traffic from the first cell, that satisfies a threshold.

16. The non-transitory computer-readable medium of claim 11, where one or more neighbor cells for the first cell include at least one of:
an intra-frequency neighbor cell,
an inter-frequency neighbor cell, or
an inter-radio access technology neighbor cell.

17. A method, comprising:
- selecting, by a device, a particular sector of a network, of a group of sectors of the network, based on loading of a plurality of cells of the network;
- identifying, by the device, a loaded cell, of the plurality of cells, based on evaluating a bit mask relating to a first set of metrics of network traffic data;
- attempting to identify, by the device, a less loaded neighbor (LLN) cell, of the plurality of cells, based on identifying the loaded cell and based on a second set of metrics of the network traffic data;
- determining, by the device, an alteration to a configuration of a network device, of the network, to cause a reduction to a loading or a congestion of the loaded cell from a first value to a second value based on attempting to identify the LLN cell,
  the second value being less than the first value; and
- causing, by the device, the alteration to the configuration of the network device.

18. The method of claim 17, where the device is a centralized self-organizing network device.

19. The method of claim 17, where attempting to identify the LLN cell comprises:
- successfully identifying a particular LLN cell; and
- where determining the alteration to the configuration comprises:
  - determining the alteration to the configuration to cause the reduction to the loading of the loaded cell, network traffic being offloaded from the loaded cell to the LLN cell.

20. The method of claim 17, where the first set of metrics includes at least one of:
- a first metric relating to a load of the network,
- a second metric relating to a predicted load of the network,
- a third metric relating to a sector inter-layer balance for the particular sector,
- a fourth metric relating to a cell outage status,
- a fifth metric relating to performing a handover,
- a sixth metric relating to radio link control set-up,
- a seventh metric relating to call admission, or
- an eighth metric relating to cell congestion.

* * * * *